UNITED STATES PATENT OFFICE 2,078,217

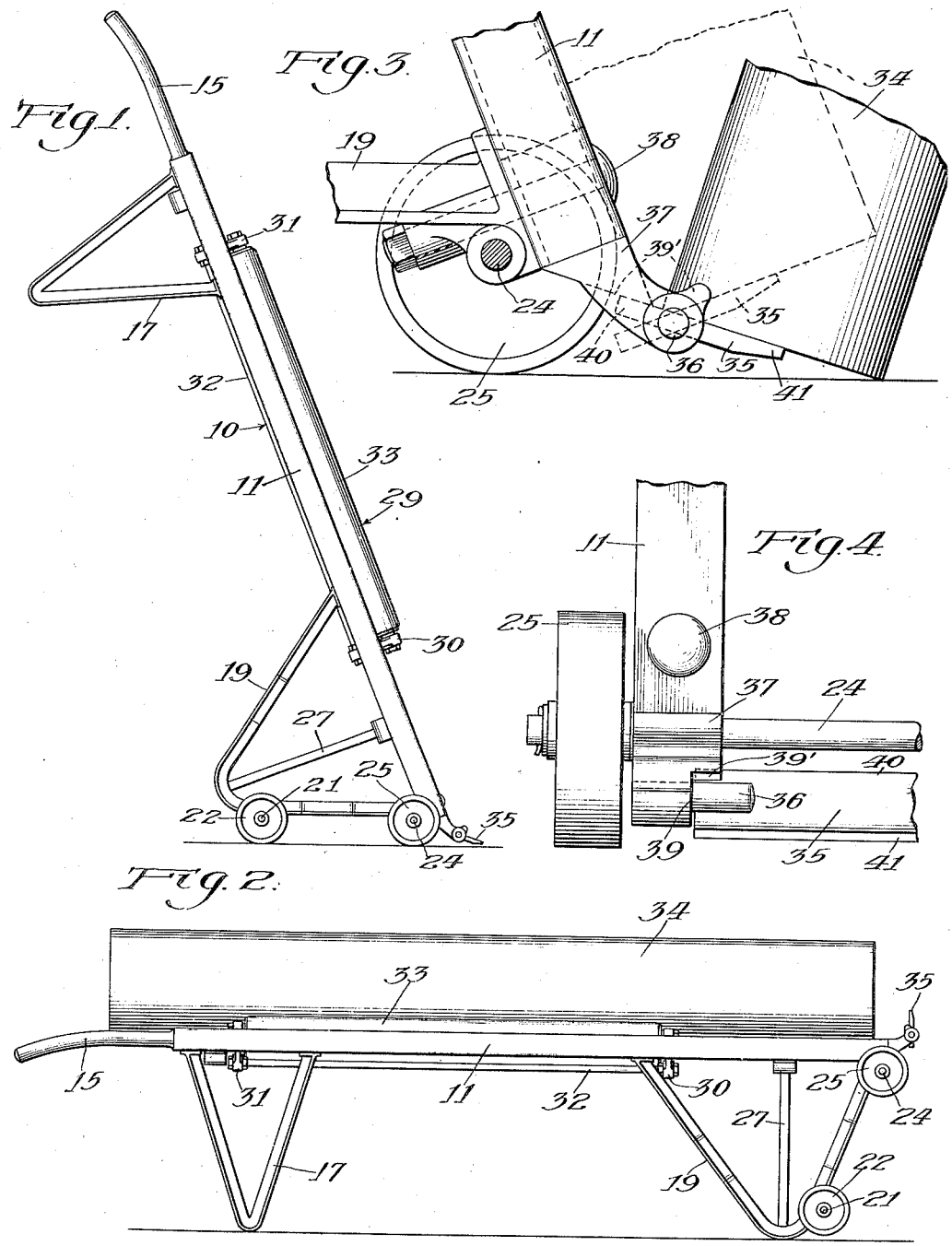

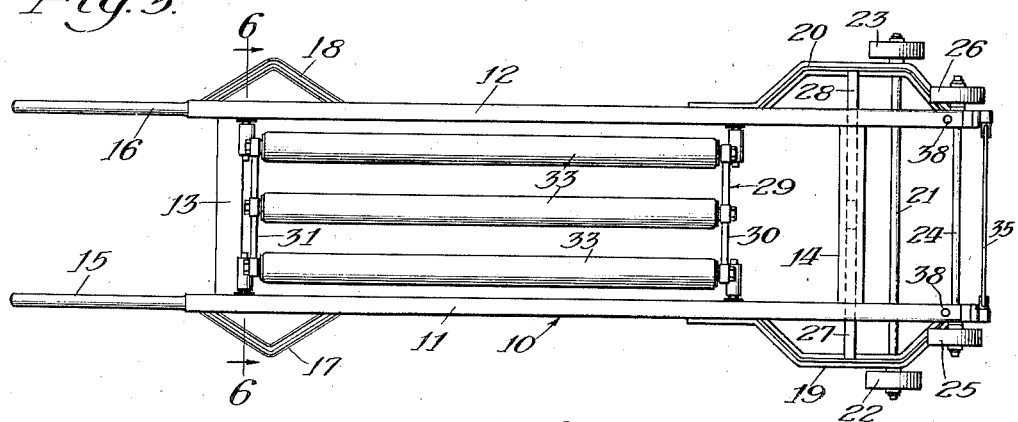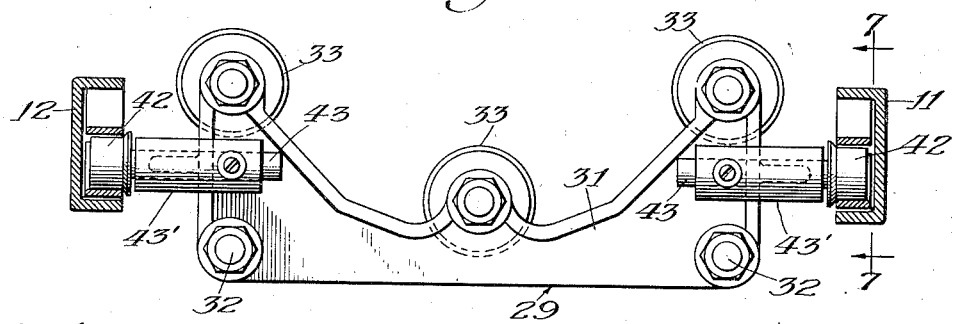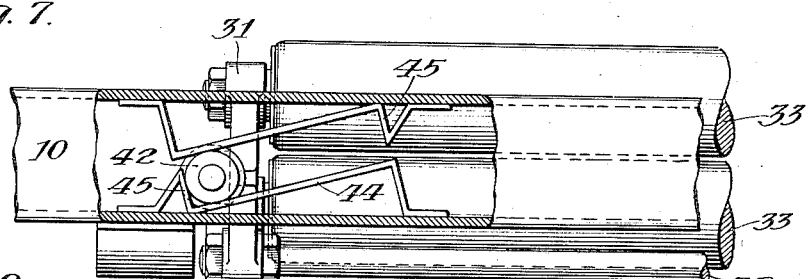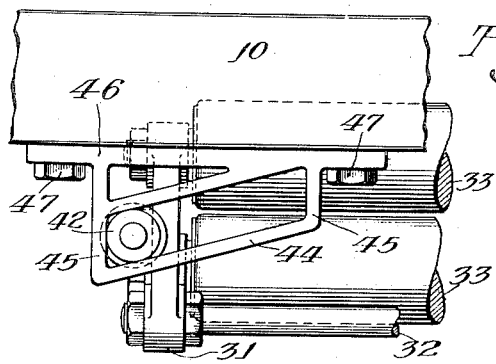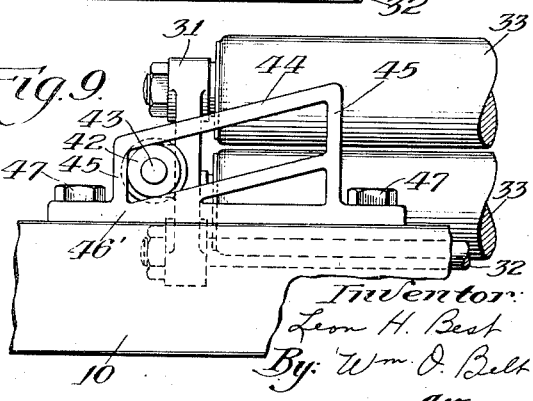

DISPLAY TRUCK

Leon H. Best, Galva, Ill., assignor to John H. Best & Sons, Inc., Galva, Ill., a corporation of Illinois Application January 29, 1936, Serial No. 61,275

6 Claims. (Cl. 280—54)

This invention relates to trucks and more particularly to that class of hand trucks which are used to handle and display linoleum and other rolled sheet material.

The principal object of the invention is to protect from damage the bottom end of the roll of material which engages the truck when placing the roll on and removing it from the truck.

Another object is to protect the bottom end of the roll of material when unrolling the material for display while the roll is supported on the truck.

A further object is to automatically remove the bottom end of the roll of material which engages the truck when the roll is picked up and transported from engagement with the truck when the truck is placed in display position thereby protecting the end of the roll from damage when the material is unrolled for display.

A still further object is to automatically replace the bottom end of the roll in engagement with the truck when the truck is swung from display to transport position to enable transportation of the roll and removal thereof from the truck without damage to the bottom end of the roll.

In the accompanying drawings

Fig. 1 is a side elevation of a truck in upright position showing a selected embodiment of my invention;

Fig. 2 is a side elevation showing the truck in horizontal position with a roll of sheet material thereon;

Fig. 3 is a detail side elevation of the shovel end of the truck with one transporting wheel removed;

Fig. 4 is a detail front elevation of one side of the shovel end of the truck;

Fig. 5 is a top plan view showing the truck in horizontal position;

Fig. 6 is a sectional view on the line 6—6 of Fig. 5;

Fig. 7 is a detail sectional view on the line 7—7 of Fig. 6 and showing the inclined track for the carriage;

Fig. 8 is a detail view of a modified form of the track and arranged beneath the frame; and Fig. 9 is a detail view of the track of Fig. 8 arranged above the frame.

A frame generally indicated by 10 comprises side members 11 and 12 preferably formed of channel iron with the open side of the channel arranged inwardly of the frame. The side members are connected by cross braces 13 and 14 adjacent the ends of the frame. Handles 15 and 16 are arranged on the side members 11 and 12 respectively at one end thereof. A pair of legs 17 and 18 are secured to the side members 11 and 12 respectively adjacent the handles and are generally V-shaped with the free ends of the arms of the V fastened to the side members and the point of the V arranged to engage the floor, Fig. 2. The legs may be arranged to incline outwardly as best shown in Fig. 5 to provide stability to the truck when in horizontal position. Another pair of legs 19 and 20 are arranged at the other end of the side members respectively and are also generally V-shaped with the free ends of the arms of the V secured to the side members and the point of the V arranged to engage the floor when the truck is in horizontal position. The arms of the legs 19 and 20 have reverse bends therein to offset the points of the V from the sides of the frame to add stability to the truck. An axle 21 is mounted on the legs 19 and 20 adjacent the point of the V and transporting wheels 22 and 23 are mounted on the ends of the axle extending beyond the legs. Another axle 24 is mounted on the legs 19 and 20 adjacent the lower end of the frame. Transporting wheels 25 and 26 are mounted on the ends of the axle 24 extending beyond the legs. Braces 27 and 28 extend from the center of the cross brace 14 to the points of the V of legs 19 and 20 respectively for imparting rigidity to the legs.

A carriage generally indicated by 29 comprises spaced end plates 30 and 31. Brace rods 32 connect the end plates to hold them in proper spaced relation. Rollers 33 are arranged between the end plates 30 and 31 and are mounted for rotation therein. The rollers are arranged longitudinally of the frame of the truck and form a centrally depressed bed for receiving a roll 34 of sheet material arranged longitudinally of the rollers, Fig. 2. In this position the exposed edge of the material may be grasped and pulled to unroll a portion of the material for display. The roll will revolve when unrolling on the rollers 33 which offer no resistance to the unrolling operation. After the unrolled portion of the material has been displayed it may then be rolled back onto the roll merely by revolving the roll in the opposite direction on the rollers 33.

It has been found with trucks used heretofore having a stationary rigid shovel plate that when a roll of sheet material standing on end is tilted forward and the shovel plate of the truck is placed thereunder and the roll brought back against the frame or carriage of the truck there is a pivoting of the roll on an edge of the shovel plate which damages the end of the roll. To prevent such damage I provide a shovel plate 35 Figs. 3 and 4 at its ends with pins 36 which are mounted for pivotal action in the ends of pivot blocks 37 secured in the side members of the frame by bolts 38. The pivot blocks are cut away at 39 forming stop shoulders 39' thereon, Fig. 4. The heel 40 of the shovel plate 35 will engage the shoulders 39' to limit downward movement of the nose 41 of the shovel plate when the truck is in upright position. To place an upstanding roll of sheet material on the truck the roll is tilted slightly away from the truck to raise the adjacent side of the end of the roll from the floor and the shovel plate is run under the raised part of the bottom end of the roll as shown in full lines in Fig. 3. The roll is then tilted back onto the truck which causes the shovel plate to pivot on its pins 36 to the position shown in dotted lines in Fig. 3. During the pivoting of the roll onto the truck the bottom end of the roll is supported by and pivots with the shovel plate and not on any corners or edges thereof thereby preventing damage to the bottom end of the roll.

Placing the roll on the truck as just described causes it to rest on the bed formed by the rollers 33 and the roll is then capable of being transported by the truck on the transporting wheels wherever desired. To display the material the truck is placed in horizontal position as shown in Fig. 2 by pivoting the truck about the wheels 22, 23 whereupon the legs 17 and 18 cooperate with the legs 19 and 20 to support the truck. The material if unrolled without the end thereof being retracted from engagement with the shovel plate would be liable to be damaged by rolling against the shovel plate and to avoid this the carriage and the roll of material are automatically withdrawn from engagement with the shovel plate. This is accomplished by carriage wheels 42 Figs. 7-9 carried on shafts 43 adjustably secured in sleeves 43' on the end plates 30 and 31 to travel on tracks 44 arranged at an incline within the channels of the side members and forming guides for the bed in moving lengthwise on the frame. The incline of the tracks is arranged to permit movement by gravity of the carriage wheels 42 downwardly and away from the shovel end of the truck when the truck is placed in horizontal position. The tracks are provided at their ends with stops 45 to limit the movement of the carriage and roll. When the truck is swung to upright position the rollers 42 will ride from left to right on the tracks, Fig. 7, to replace the end of the roll in engagement with the shovel plate, and when it is desired to remove the roll from the truck the roll need be merely pivoted with the shovel plate on the pins 36 until it engages the floor and the shovel plate may then be removed from the roll and the roll placed in upright position, all of this being done without any injury or damage to the end of the roll.

Instead of locating the tracks within the channelled side members I may provide castings 46, Fig. 8, having the tracks 44 and stops 45 thereon and secure them to the bottom of the side members by bolts 47 or I may arrange similar castings ings 46' on top of the side members as illustrated in Fig. 9. The only difference in the arrangements of the tracks is in the elevation of the carriage with respect to the side members.

I have shown and described my invention in a specific form but I wish it to be understood that changes and alterations may be made therein and I therefore do not wish to be limited to the precise details set forth but desire to avail myself of such changes and alterations as fall within the scope of the following claims:

I claim:

1. A truck for handling and displaying rolls of sheet material and comprising a frame, transporting wheels mounted on the frame, a shovel plate pivotally mounted on the lower end of the frame, and a bed on the frame to receive a roll of material and means automatically movable to shift the bed lengthwise of the frame away from the shovel plate as the truck is moved from upright to horizontal or display position to protect the adjacent end of the roll from damage by the shovel plate while the roll is being unrolled for purposes of display.

2. A truck for handling and displaying rolls of sheet material and comprising a frame, transporting wheels mounted on the frame, a shovel plate pivotally mounted on the end of the frame, a bed on the frame to receive a roll of material, and means on the frame causing the bed to move automatically to shift the roll lengthwise of the frame away from and toward the shovel plate as the frame and roll are moved between upright and horizontal positions.

3. A truck for handling and displaying rolls of sheet material and comprising a frame, transporting wheels mounted on the frame, a shovel plate on the lower end of the frame, a bed on the frame to receive a roll of material, and means for causing the bed to move automatically on the frame to shift the roll away from the shovel plate as the truck is placed in horizontal position to prevent injury to the material by the shovel plate as the material is unrolled for display and to shift the roll to and upon the shovel plate as the truck is placed in upright position.

4. A truck for handling and displaying rolls of sheet material and comprising a frame, transporting wheels mounted on the frame, a shovel plate movably mounted on the frame at the lower end thereof and adapted to engage a roll of material beneath its bottom end and to move with the roll to protect the end of the roll from damage thereby when the roll is moved onto and off of the truck, and means on the truck to protect the end of the roll from damage by the shovel plate by causing the roll to move automatically away from the shovel plate as the truck is placed in horizontal position and said means causing the roll to move automatically towards and onto the shovel plate as the truck is placed in upright position.

5. A truck for handling and displaying rolls of sheet material and comprising a frame, transporting wheels mounted on the frame, a shovel plate mounted on the frame, a movable bed on the frame to receive a roll of material, guides on the frame inclined toward the shovel plate, and rollers on the bed arranged to travel in said guides to automatically shift the bed and the roll thereon lengthwise of the frame when the truck is swung between upright and horizontal positions whereby the roll is disengaged from the shovel plate when unrolling the material for display and engaged with the shovel plate when transporting the material.

6. A truck for handling and displaying rolls of sheet material and comprising a frame, the sides of said frame being formed of channel irons, transporting wheels mounted on the frame, inclined guides arranged in the channel irons, a movable bed on the frame, and rollers on the bed arranged to travel in said guides to automatically shift the bed and the roll thereon lengthwise of the frame when the truck is swung between upright and horizontal positions.

LEON H. BEST.